United States Patent
Mihira

(10) Patent No.: US 8,958,089 B2
(45) Date of Patent: Feb. 17, 2015

(54) FACSIMILE APPARATUS AND CONTROL METHOD THEREFOR

(75) Inventor: Yoshiro Mihira, Inagi (JP)

(73) Assignee: Canon Kabushiki Kaisha (JP)

(*) Notice: Subject to any disclaimer, the term of this patent is extended or adjusted under 35 U.S.C. 154(b) by 1356 days.

(21) Appl. No.: 12/269,763

(22) Filed: Nov. 12, 2008

(65) Prior Publication Data

US 2009/0122356 A1    May 14, 2009

(30) Foreign Application Priority Data

Nov. 13, 2007   (JP) ................................ 2007-294878

(51) Int. Cl.
G06K 15/00 (2006.01)
H04N 1/333 (2006.01)
H04N 1/00 (2006.01)
H04N 1/34 (2006.01)

(52) U.S. Cl.
CPC ........... *H04N 1/333* (2013.01); *H04N 1/00127* (2013.01); *H04N 1/34* (2013.01)
USPC .......................................... 358/1.14; 713/154

(58) Field of Classification Search
None
See application file for complete search history.

(56) References Cited

U.S. PATENT DOCUMENTS

| | | | | |
|---|---|---|---|---|
| 6,157,464 A | * | 12/2000 | Bloomfield et al. | .......... 358/407 |
| 2003/0072448 A1 | | 4/2003 | Nakamura et al. | |
| 2007/0083751 A1 | * | 4/2007 | Yami et al. | ..................... 713/156 |
| 2009/0328225 A1 | * | 12/2009 | Chambers et al. | .............. 726/26 |

FOREIGN PATENT DOCUMENTS

| | | |
|---|---|---|
| JP | 2000-49998 A | 2/2000 |
| JP | 2003-122537 A | 4/2003 |
| JP | 2007-028816 A | 2/2007 |
| JP | 2007-288316 A | 11/2007 |

OTHER PUBLICATIONS

Japanese Office Action issued in counterpart application No. JP2007-294878, dated Mar. 19, 2012.
JP Office Action issued May 28, 2012 for corresponding JP2007-294878.

* cited by examiner

*Primary Examiner* — Saeid Ebrahimi Dehkordy
*Assistant Examiner* — Lennin Rodriguezgonzale
(74) *Attorney, Agent, or Firm* — Rossi, Kimms & McDowell LLP

(57) ABSTRACT

The present invention provides a facsimile apparatus which provides a facsimile function to a cooperative image forming apparatus connected to a network, the facsimile apparatus comprising a receiving unit configured to perform facsimile reception via a public line, a determining unit configured to, when the receiving unit receives data to be transferred to the cooperative image forming apparatus, determine whether a license of the cooperative image forming apparatus which can be provided with the facsimile function is valid or invalid, and a control unit configured to restrict transfer of the data to the cooperative image forming apparatus based on a determination result by the determining unit.

6 Claims, 16 Drawing Sheets

| 401 | 402 | 403 | 404 | 405 | 406 | 407 | 408 |
|---|---|---|---|---|---|---|---|
| FUNCTION ID | FUNCTION NAME | STATUS | DEPENDENCE | EXPIRATION DATE | VALID COUNT | FREE REGISTER | FREE REGISTER |
| 001 | MAIL SEND / RECEPTION | 1 | - | - | - | - | - |
| 002 | REMOTE CONTROL | 1 | - | - | - | - | - |
| 003 | DOCUMENT FORMAT CONVERSION | 1 | - | - | - | - | - |
| 004 | DOCUMENT MANAGEMENT SYSTEM | 1 | - | - | - | - | - |
| 005 | DOCUMENT ENCRYPTION | 0 | 001 | - | - | - | - |
| 006 | FACSIMILE SERVER | 0 | - | - | - | - | - |
| 007 | FACSIMILE CLIENT | 0 | - | - | - | - | - |

FIG. 11

| ORIGINATING NUMBER (1101) | TERMINATING TELEPHONE NUMBER (1102) | FACSIMILE SERVER PROCESSING, TRANSFER (1103) | CLIENT INFORMATION (1104) |
|---|---|---|---|
| - | 044-222-5678 | PROCESSING BY FACSIMILE SERVER | - |
| 03-1234-5678 | - | TRANSFER PROCESSING | 192.168.1.10 |
| 045-678-9123 | - | TRANSFER PROCESSING | 192.168.1.12 |
| - | 044-2222-5679 | TRANSFER PROCESSING | 192.168.1.12 |

FIG. 12

```
2007 01/12 FRI 13:25      FAX0123456789    company                              001

********************************************
           *** FAX RECEIPT NOTIFICATION REPORT ***
           ********************************************

RECEIPT NUMBER        0123
    PARTNER ADDRESS       company
    START TIME            01/12 13:02
    COMMUNICATION TIME    01'14
    NUMBER OF SHEETS      2
    COMMUNICATION RESULT  OK MFP 3 EXECUTED RECEPTION PROCESSING BECAUSE LICENSE OF
    FAX CLIENT FUNCTION HAS EXPIRED.
```

```
2007 01/12 FRI 13:25     FAX0123456789   company                    001

*******************************************
           *** FAX RECEIPT NOTIFICATION REPORT ***
           *******************************************

RECEIPT NUMBER        0123
    PARTNER ADDRESS       company
    START TIME            01/12 13:02
    COMMUNICATION TIME    01'14
    NUMBER OF SHEETS      2
    COMMUNICATION RESULT  OK MFP 3 EXECUTED RECEPTION PROCESSING BECAUSE LICENSE OF
    FAX CLIENT FUNCTION HAS EXPIRED.
```

1301

FAX                                                 2007 / 1 / 12

DESTINATION                          ORIGINATOR
XXX COMPUTER                         YYY COMPUTER
MR. XXX                              TEL 03-1234-1234
TEL 03-1234-1234                     FAX 03-1234-1235
FAX 03-1234-1235
                                     NUMBER OF RECEIVED SHEETS
                                     2

WE WOULD LIKE TO HAVE ESTIMATE FOR SYSTEM
CONFIGURATION BELOW.

SLIM PC

```
2007 01/12 FRI 13:25    FAX0123456789    company              001

*******************************************
        ***   FAX RECEIPT NOTIFICATION REPORT   ***
        *******************************************

RECEIPT NUMBER        0123
PARTNER ADDRESS       company
START TIME            01/12  13:02
COMMUNICATION TIME    01'14
NUMBER OF SHEETS      2
COMMUNICATION RESULT  OK MFP 3 EXECUTED RECEPTION PROCESSING BECAUSE LICENSE OF
FAX CLIENT FUNCTION HAS EXPIRED.
```

CONTACT MFP 3 SERVICE TO ENABLE FAX CLIENT FUNCTION.

MFP 3 SERVICE  TEL 0120-123-456
http//www.mfo-s.co.jp/fax-license/

FACSIMILE APPARATUS AND CONTROL METHOD THEREFOR

BACKGROUND OF THE INVENTION

1. Field of the Invention

The present invention relates to a facsimile apparatus having a facsimile communication function and a control method therefor.

2. Description of the Related Art

Recently, image forming apparatuses are achieving advanced functions using digitization and networking. As an example of the advanced functions, a plurality of image forming apparatuses connected to a network can execute one processing in cooperation with each other. For example, even when a local image forming apparatus (image forming apparatus operated by the user) does not have the facsimile function, it can execute facsimile transmission in cooperation with a remote image forming apparatus having the facsimile function. More specifically, image data obtained by scanning a document by the local image forming apparatus can be transferred to the remote image forming apparatus, and transmitted by facsimile. In addition, image data received by facsimile by the remote image forming apparatus having the facsimile function can also be automatically transferred to the local image forming apparatus, and output (printed) by the local image forming apparatus. In this manner, the facsimile function can be provided to an apparatus having no facsimile function.

The function of an image forming apparatus is provided as a standard function or an option function (function added separately from standard functions in accordance with the user need). There are known two methods of providing an option function to an image forming apparatus.

According to the first method, an option function is provided by adding, to an image forming apparatus, a physical device which implements the option function. For example, an option function of bookbinding printed materials can be provided by adding a bookbinding device to an image forming apparatus.

According to the second method, an option function is provided by installing a license file for enabling the option function. This method is often employed when providing an option function (e.g., a function of transmitting scanned image data as a file attached to e-mail) implemented by software. In this case, a program which provides an option function is invalid in a standard state (in which no license is held) even if it is stored in an image forming apparatus. When the user needs the option function, he purchases the license of the option function to obtain a license key and install a license file including these. As a result, the option function can be enabled (i.e., the user can use the option function).

When providing the license of an option function, a trial license is sometimes provided to the user to prompt him to actually check the effectiveness of the option function. The trial license enables the option function only for a predetermined period or by a predetermined count (trial period) and allows the user to make a trial use of the option function. For example, the trial license allows the user to make a trial use of a function of transmitting scanned image data up to 100 times.

There is also proposed a technique of backing up the current application software in a server, transferring new application software containing an option function to an image forming apparatus, and allowing the user to make a trial use of the option function. After the trial period has expired, the application software backed up in the server is transferred to disable the trial use of the option function (see, Japanese Patent Laid-Open No. 2000-049998).

When the trial license-provided option function is a simple function such as a function of sending scanned image data by mail, the user cannot only use the send function even after the license is disabled (i.e., even after the trial period expires).

However, when the trial license-provided option function is a function of using the facsimile function of a remote image forming apparatus (a cooperative function of a plurality of image forming apparatuses), and a reply to facsimile data sent within the trial period is received after the trial period, a problem arises in how to handle facsimile data received by the remote image forming apparatus. This problem occurs not only for a trial license but also for a license which sets the validity period and a license which sets the use count.

SUMMARY OF THE INVENTION

The present invention provides a new technique concerning handling of data received after the validity period of the license of a facsimile function in a facsimile apparatus which provides the facsimile function to a cooperative image forming apparatus.

According to the first aspect of the present invention, there is provided a facsimile apparatus which provides a facsimile function to a cooperative image forming apparatus connected to a network, the facsimile apparatus comprising:

a receiving unit configured to perform facsimile reception via a public line;

a determining unit configured to, when the receiving unit receives data to be transferred to the cooperative image forming apparatus, determine whether a license of the cooperative image forming apparatus which can be provided with the facsimile function is valid or invalid; and a control unit configured to restrict transfer of the data to the cooperative image forming apparatus based on a determination result by the determining unit.

According to the second aspect of the present invention, there is provided a method of controlling a facsimile apparatus which provides a facsimile function to a cooperative image forming apparatus connected to a network, the method comprising:

a determining step of, when the facsimile apparatus receives data to be transferred to the cooperative image forming apparatus, determining whether a license of the cooperative image forming apparatus which can be provided with the facsimile function is valid or invalid; and a control step of restricting transfer of the data to the cooperative image forming apparatus based on a determination result in the determining step.

Further features of the present invention will become apparent from the following description of exemplary embodiments with reference to the attached drawings.

BRIEF DESCRIPTION OF THE DRAWINGS

FIG. 4 is a table showing an example of a license information table managed by a license management functional unit shown in FIG. 3.

FIG. 11 is a table showing an example of a transfer setting table held in an image forming apparatus serving as a facsimile server.

FIG. 12 is a view showing an example of a receipt notification transmitted from an image forming apparatus serving as a facsimile server to an image forming apparatus serving as a facsimile client whose license is invalid.

FIG. 13 is a view showing an example of a receipt notification transmitted from an image forming apparatus serving as a facsimile server to an image forming apparatus serving as a facsimile client whose license is invalid.

FIG. 14 is a view showing an example of a receipt notification transmitted from an image forming apparatus serving as a facsimile server to an image forming apparatus serving as a facsimile client whose license is invalid.

DESCRIPTION OF THE EMBODIMENT

Figure 1:
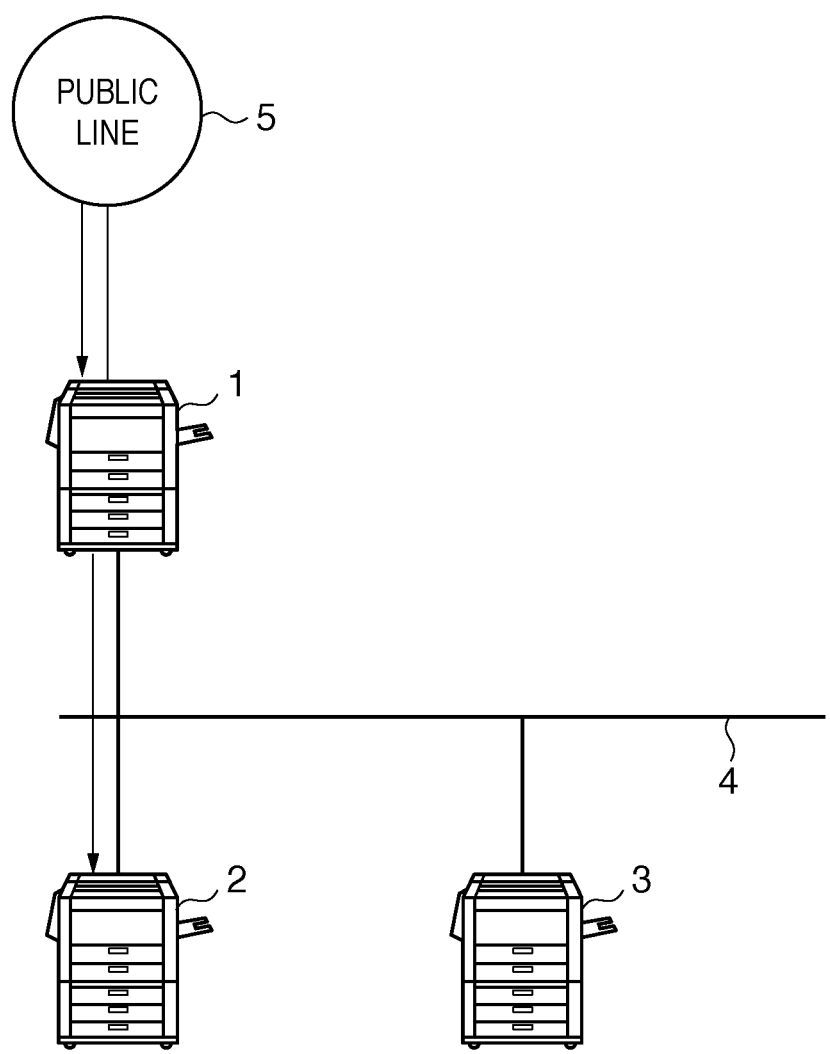
FIG. 1 is a view showing the configuration of a system including image forming apparatuses as one aspect of the present invention.

A preferred embodiment of the present invention will be described below with reference to the accompanying drawings. The same reference numerals in the drawings denote the same parts, and a repetitive description thereof will be omitted.

FIG. 1 is a view showing the configuration of a system including image forming apparatuses as one aspect of the present invention. The system shown in FIG. 1 includes image forming apparatuses 1, 2, and 3.

The image forming apparatuses 1 to 3 are, for example, multi-functional peripherals having a printer function of forming an image on a printing medium, and a scanner function of scanning a document image. The image forming apparatuses 1 to 3 can cooperate with each other, and in the embodiment, provide or are provided with a facsimile function. Providing the facsimile function means that an apparatus having the facsimile function performs facsimile transmission and facsimile reception, instead of another apparatus. More specifically, an apparatus having the facsimile function facsimile-transmits data transferred from another apparatus, or transfers facsimile-received data to another apparatus.

The image forming apparatus 1 includes a facsimile board (not shown), and has a facsimile function connected to an external public line 5. In the embodiment, the image forming apparatus 1 is a facsimile server (facsimile transmission/reception proxy server) which provides the facsimile function as an option function to the image forming apparatuses 2 and 3. The image forming apparatus 1 operating as a facsimile server suffices to have the facsimile function, and need have neither the scanner unit nor printer unit. The image forming apparatus 1 may also provide only facsimile transmission or facsimile reception.

The image forming apparatuses 2 and 3 are facsimile clients (cooperative image forming apparatuses) which are not connected to the public line 5 and perform facsimile transmission/reception via the image forming apparatus 1 serving as a facsimile server. The image forming apparatus 2 cannot use the facsimile function provided by the image forming apparatus 1 because the trial period of the trial license of the facsimile function has expired. The image forming apparatus 3 still stays within the trial period of the trial license of the facsimile function provided by the image forming apparatus 1 or has an authentic license, and can perform facsimile transmission and facsimile reception via the image forming apparatus 1.

A network 4 connects the image forming apparatuses 1 to 3 to each other, implementing a LAN connection such as an Ethernetwork.

Figure 2:
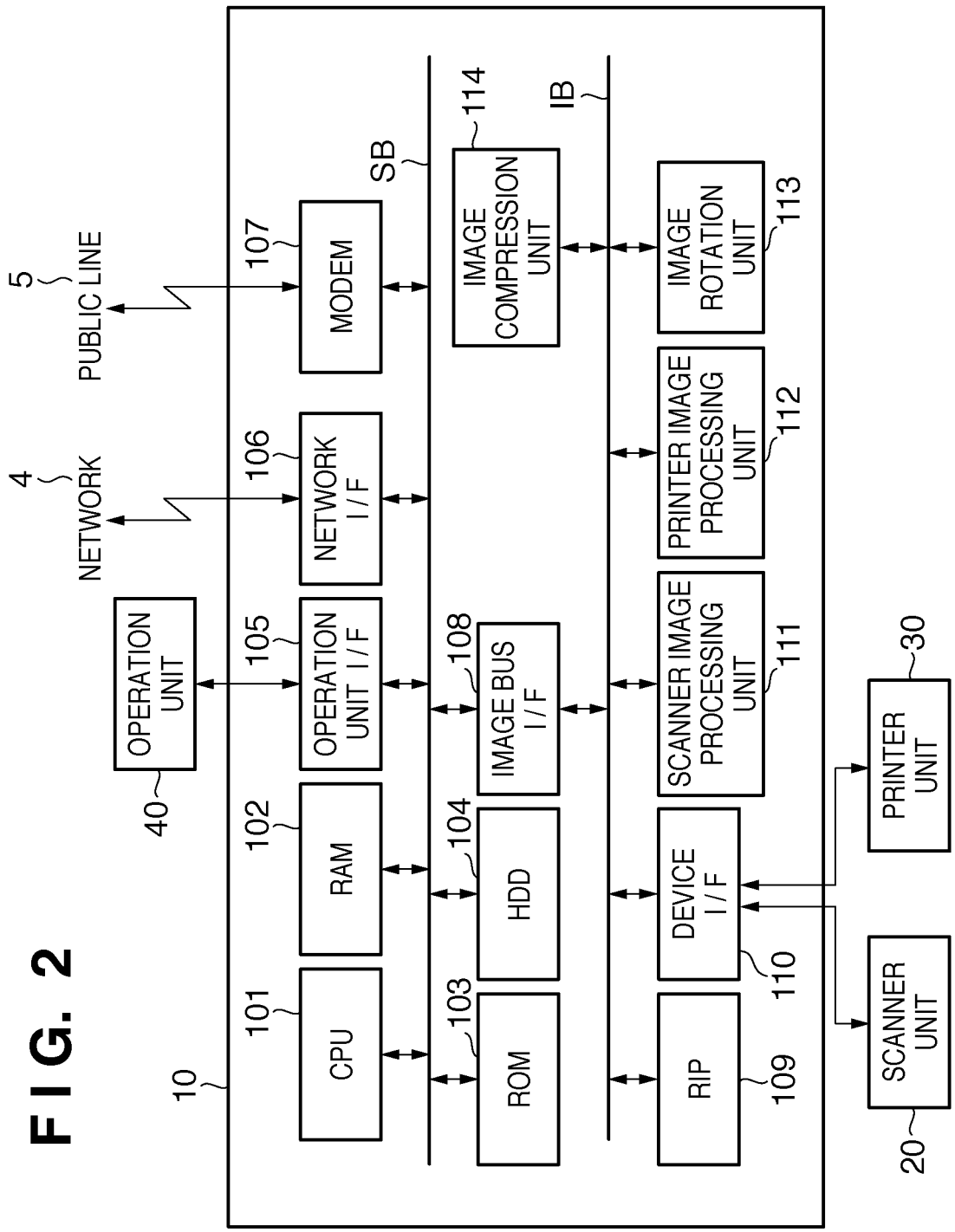
FIG. 2 is a schematic block diagram showing the hardware configuration of the image forming apparatus shown in FIG. 1.

FIG. 2 is a schematic block diagram showing the hardware configuration of the image forming apparatus 1. As shown in FIG. 2, the image forming apparatus 1 includes a control unit 10, scanner unit 20, printer unit 30, and operation unit 40. The hardware configuration of the image forming apparatus 1 is the same as those of the image forming apparatuses 2 and 3, so the embodiment will exemplify the image forming apparatus 1.

The control unit 10 is connected to the scanner unit 20 serving as an image input device for scanning an image such as a document and inputting the image data, the printer unit 30 serving as an image output device, and the network 4 and public line 5 shown in FIG. 1. The control unit 10 controls input/output of image information (image data) and device information.

In the embodiment, the control unit 10 includes a CPU 101, RAM 102, ROM 103, hard disk drive (HDD) 104, operation unit interface (I/F) 105, and network interface (I/F) 106. The control unit 10 also includes a modem 107, image bus interface (I/F) 108, raster image processor (RIP) 109, and device interface (I/F) 110. Further, the control unit 10 includes a scanner image processing unit 111, printer image processing unit 112, image rotation unit 113, and image compression unit 114.

The CPU 101, RAM 102, ROM 103, HDD 104, operation unit I/F 105, network I/F 106, and modem 107 are connected to a system bus SB. The RIP 109, device I/F 110, scanner image processing unit 111, printer image processing unit 112, image rotation unit 113, and image compression unit 114 are connected to an image bus IB. The image bus I/F 108 is connected to the system bus SB and image bus IB. The image bus IB transfers image data at high speed, and is formed from a PCI bus or IEEE1394 bus.

The CPU 101 is a controller which controls the whole image forming apparatus 1.

The RAM 102 is a system work memory for operating the CPU 101. The RAM 102 is also an image memory for temporarily storing image data.

The ROM 103 is a boot ROM which stores the boot program of the system of the image forming apparatus 1.

The HDD 104 stores system software, application software, and image data (to be described later).

The operation unit I/F 105 is an interface with the operation unit 40, and outputs, to the operation unit 40, image data to be displayed on the operation unit 40. The operation unit I/F 105 has a function of transmitting, to the CPU 101, information (instruction) input by the user via the operation unit 40.

The network I/F 106 is connected to the network 4, and inputs/outputs information such as image data.

The modem 107 is connected to the public line 5, and inputs/outputs information such as image data.

The image bus I/F 108 is a bus bridge which converts the data structure.

The RIP 109 bitmaps a PDL code into a bitmap image.

The device I/F 110 connects the scanner unit 20 and printer unit 30 to the control unit 10.

The scanner image processing unit 111 performs correction processing, manipulation processing, edit processing, and the like for image data input from the scanner unit 20.

The printer image processing unit 112 performs print correction processing, resolution conversion processing, and the like for image data to be output to the printer unit 30.

The image rotation unit 113 performs rotation processing for image data.

The image compression unit 114 converts multilevel image data into JPEG data, or performs JBIG, MMR, or MH compression/decompression processing for binary image data.

The operation unit 40 includes a display device (operation panel) such as an LCD, accepts an instruction from the user, and displays information (e.g., the state of the image forming apparatus 1) to the user.

Figure 3:
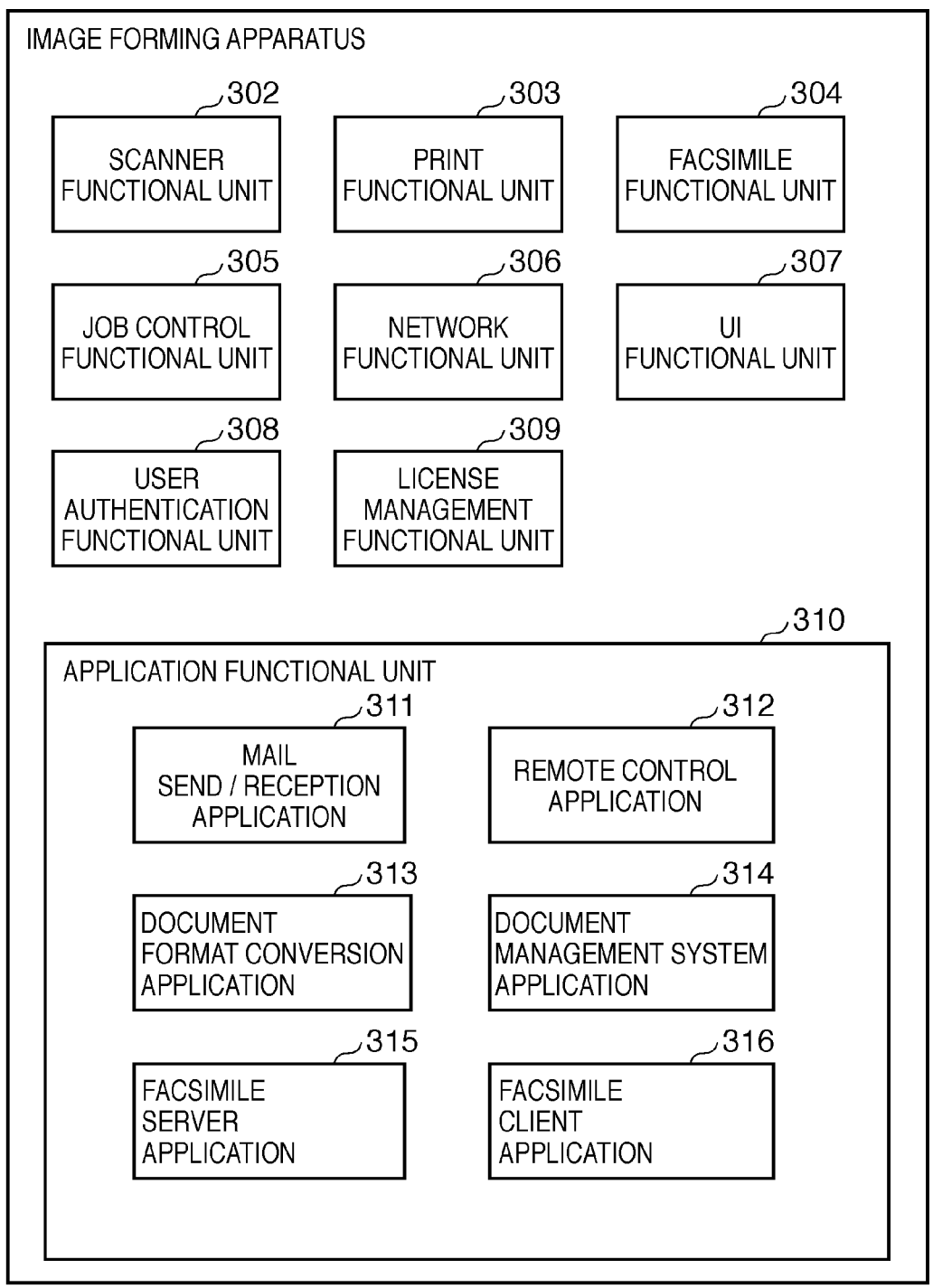
FIG. 3 is a schematic block diagram showing the software configuration of the image forming apparatus shown in FIG. 1.

FIG. 3 is a schematic block diagram showing the software configuration of the image forming apparatus 1. As shown in FIG. 3, the image forming apparatus 1 includes a scanner functional unit 302, print functional unit 303, facsimile functional unit 304, job control functional unit 305, and network functional unit 306. The image forming apparatus 1 further includes a user interface (UI) functional unit 307, user authentication functional unit 308, license management functional unit 309, and application functional unit 310.

The scanner functional unit 302 has a function of scanning a document image using the scanner unit 20, and converting the document image into binary or multilevel image data.

The print functional unit 303 has a function of adding image data converted by the scanner functional unit 302 to a command to the printer unit 30, and outputting the image data to the printer unit 30.

The facsimile functional unit 304 encodes image data converted by the scanner functional unit 302 in accordance with the facsimile standard such as G3 or G4. The facsimile functional unit 304 has a function of communicating with an external facsimile apparatus by a protocol complying with the facsimile standard. The facsimile functional unit 304 also has a function of transmitting/receiving facsimile data (facsimile image data) complying with the facsimile standard to/from an external facsimile apparatus.

The job control functional unit 305 queues, as a print job, image data from the scanner functional unit 302 or image data externally received from the facsimile functional unit 304. The job control functional unit 305 properly outputs image data to the print functional unit 303, the facsimile functional unit 304, the network functional unit 306, a facsimile server application 315, or a facsimile client application 316.

The network functional unit 306 has various network protocol functions such as TCP/IP, HTTP, FTP, LDAP, SNMP, SMTP, and SSL.

The UI functional unit 307 manages a user instruction input/output via the operation unit 40 of the image forming apparatus 1, and provision of information to the user. The UI functional unit 307 displays, on the operation panel, an operation window including an input field for inputting an instruction from the user, or an output field for outputting information to the user. The UI functional unit 307 notifies another functional unit of a user instruction input via the operation window. The UI functional unit 307 also has a function of displaying, as an operation window designed in advance, information from another functional unit to the user.

The user authentication functional unit 308 has a function of authenticating, by using user authentication information in response to user authentication requests from various applications of the application functional unit 310, a user who operates various functions of the image forming apparatus. The user authentication information is stored in the user authentication information storage of a user authentication server (not shown) or image forming apparatus connected to the network 4.

The license management functional unit 309 manages various applications which run in the application functional unit 310. For example, the license management functional unit 309 enables various applications by installing a license file including a license key issued by a license information issuing server (not shown). The license management functional unit 309 disables various applications by uninstalling a license file which has been installed by a user operation via the UI functional unit 307 and includes a license key. The license management functional unit 309 enables or disables an application by rewriting the license status (install or uninstall) of each application in a license information table stored in a nonvolatile storage area such as the HDD 104. The license information table will be explained in detail later.

The application functional unit 310 has a function of executing various applications which run in the image forming apparatus. In the embodiment, the application functional unit 310 includes a mail send/reception application 311, remote control application 312, document format conversion application 313, and document management system application 314. The application functional unit 310 further includes the facsimile server application 315 and facsimile client application 316.

The mail send/reception application 311 is one application of the image forming apparatus that runs in the application functional unit 310. The mail send/reception application 311 has a function of receiving, via the network functional unit 306, electronic document-attached e-mail sent from an information terminal connected to the network 4. The mail send/reception application 311 also has a function of printing electronic document-attached e-mail via the print functional unit 303. Further, the mail send/reception application 311 has a function of attaching an electronic document scanned via the scanner functional unit 302 to e-mail, and sending the e-mail to a preset transfer destination.

The remote control application 312 is one application of the image forming apparatus that runs in the application functional unit 310. The remote control application 312 has a function of enabling remote control by displaying, on an information terminal connected to the network 4, the same interface as the operation panel displayed on the image forming apparatus via the UI functional unit 307.

The document format conversion application 313 is one application of the image forming apparatus that runs in the application functional unit 310. The document format conversion application 313 has a function of converting electronic data scanned via the scanner functional unit 302 or electronic data received via the network functional unit 306 into a preset electronic data format.

The document management system application 314 is one application of the image forming apparatus that runs in the application functional unit 310. The document management system application 314 has a function of storing, in a preset document save area on the network 4 or that of the image forming apparatus, electronic data scanned via the scanner functional unit 302 or electronic data received via the network functional unit 306.

The facsimile server application 315 is one application of the image forming apparatus that runs in the application functional unit 310. The facsimile server application 315 is an application for cooperating with facsimile clients such as the image forming apparatuses 2 and 3. The facsimile server application 315 accepts a facsimile transmission request from the facsimile client, and transmits target data using the facsimile functional unit 304 via the public line 5. The facsimile server application 315 transfers received data accepted by the facsimile functional unit 304 via the public line 5 to an appropriate facsimile client.

The facsimile client application 316 is one application of the image forming apparatus that runs in the application functional unit 310. The facsimile client application 316 is an application for cooperating with a facsimile server such as the image forming apparatus 1. In facsimile transmission, the facsimile client application 316 transfers transmission data to the image forming apparatus 1 serving as a facsimile server, implementing transmission processing (facsimile transmission). In facsimile reception, the facsimile client application 316 receives data received by the image forming apparatus 1 from it, implementing reception processing (facsimile reception).

Various applications (the mail send/reception application 311 to facsimile client application 316) in the application functional unit 310 execute user authentication when the user uses them. The user authentication processing is requested of the user authentication functional unit 308 via the application functional unit 310.

FIG. 4 is a table showing an example of a license information table 400 managed by the license management functional unit 309. As described above, the license information table 400 is stored in a nonvolatile storage area such as the HDD 104. When installing or uninstalling a license file including the license keys of various applications, the license status in the license information table 400 is rewritten to enable or disable each application. For example, the license information table 400 has eight fields, as shown in FIG. 4. More specifically, the license information table 400 has a function ID field 401, function name field 402, status field 403, and dependence field 404. The license information table 400 also has an expiration date field 405, valid count field 406, and free register fields 407 and 408.

The function ID field 401 is a numerical field which stores function IDs corresponding to various applications which run in the application functional unit 310.

The function name field 402 is a text field which stores function names corresponding to various applications which run in the application functional unit 310.

The status field 403 is a numerical field which stores information representing whether various applications which run in the application functional unit 310 are available. In other words, the status field 403 stores information representing whether a license file including a license key has been installed or has not been installed. For example, when a license file including the license key of an application has been installed, "1" is set in the status field 403. When a license file including the license key of an application has not been installed, "0" is set in the status field 403.

The dependence field 404 is a numerical field which stores the function IDs of applications dependent on each other among various applications which run in the application functional unit 310.

The expiration date field 405 is a date field which stores the expiration date (i.e., the period during which an application is available) of an application among various applications which run in the application functional unit 310.

The valid count field 406 is a numerical field which stores the valid count (i.e., the count at which an application is available) of an application among various applications which run in the application functional unit 310.

The free register field 407 is a numerical field which stores a free register definable for each application among various applications which run in the application functional unit 310.

The free register field 408 is a text field which stores a free register definable for each application among various applications which run in the application functional unit 310.

Procedures to enable an option function in the image forming apparatuses 1 to 3 will be explained with reference to FIGS. 5 to 9.

Figure 5:
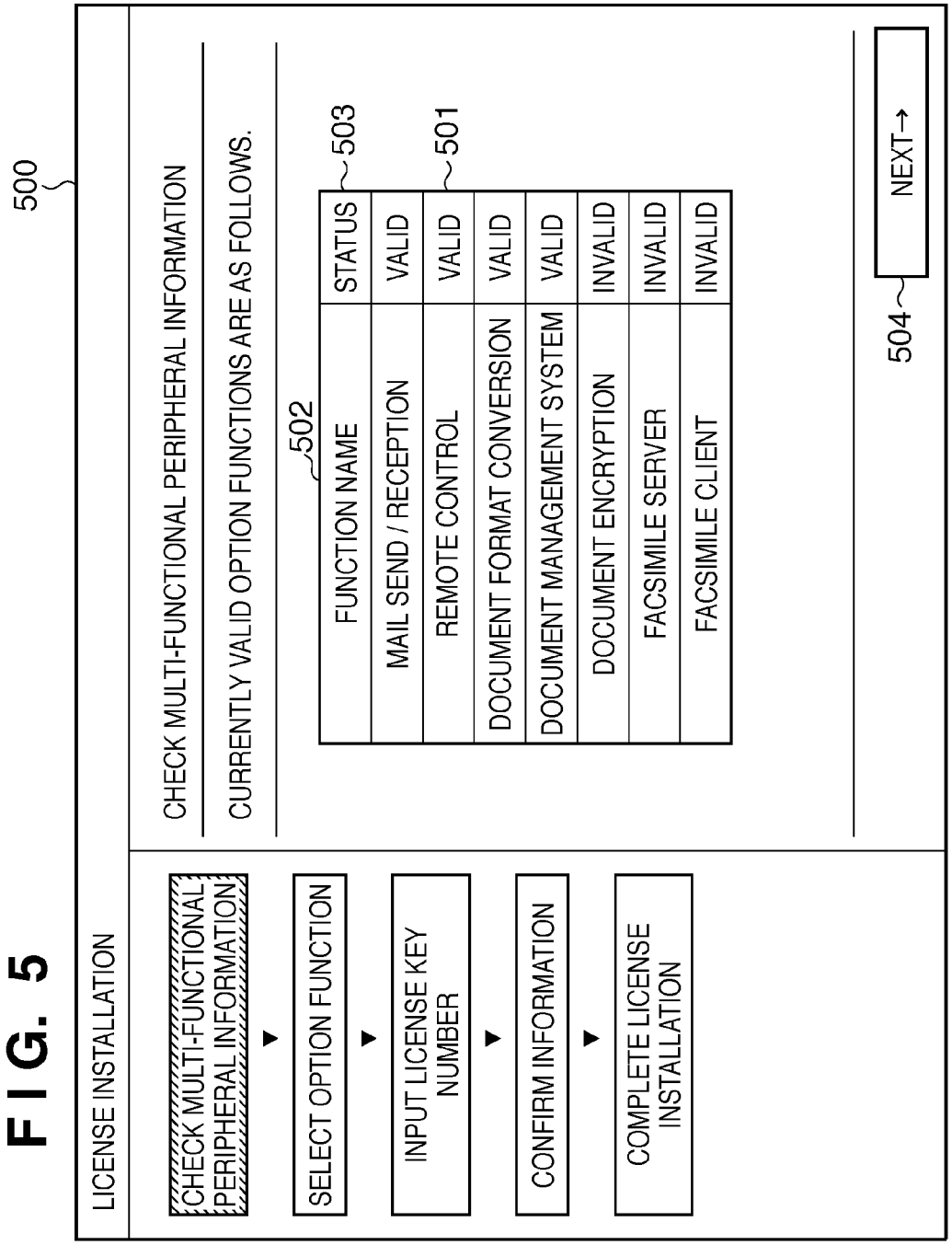
FIG. 5 is a view showing an example of an operation window which is displayed on (the operation panel of) the operation unit of the image forming apparatus shown in FIG. 1, and includes an option function information list.

FIG. 5 is a view showing an example of an operation window 500 which is displayed on (the operation panel of) the operation unit 40 and includes an option function information list 501. The option function information list 501 is a table in which a function name 502 of each option function and a status 503 of the option function are displayed on one line. When enabling an option function, the user checks the option function information list 501 of the operation window 500, and selects a Next button 504.

Figure 6:
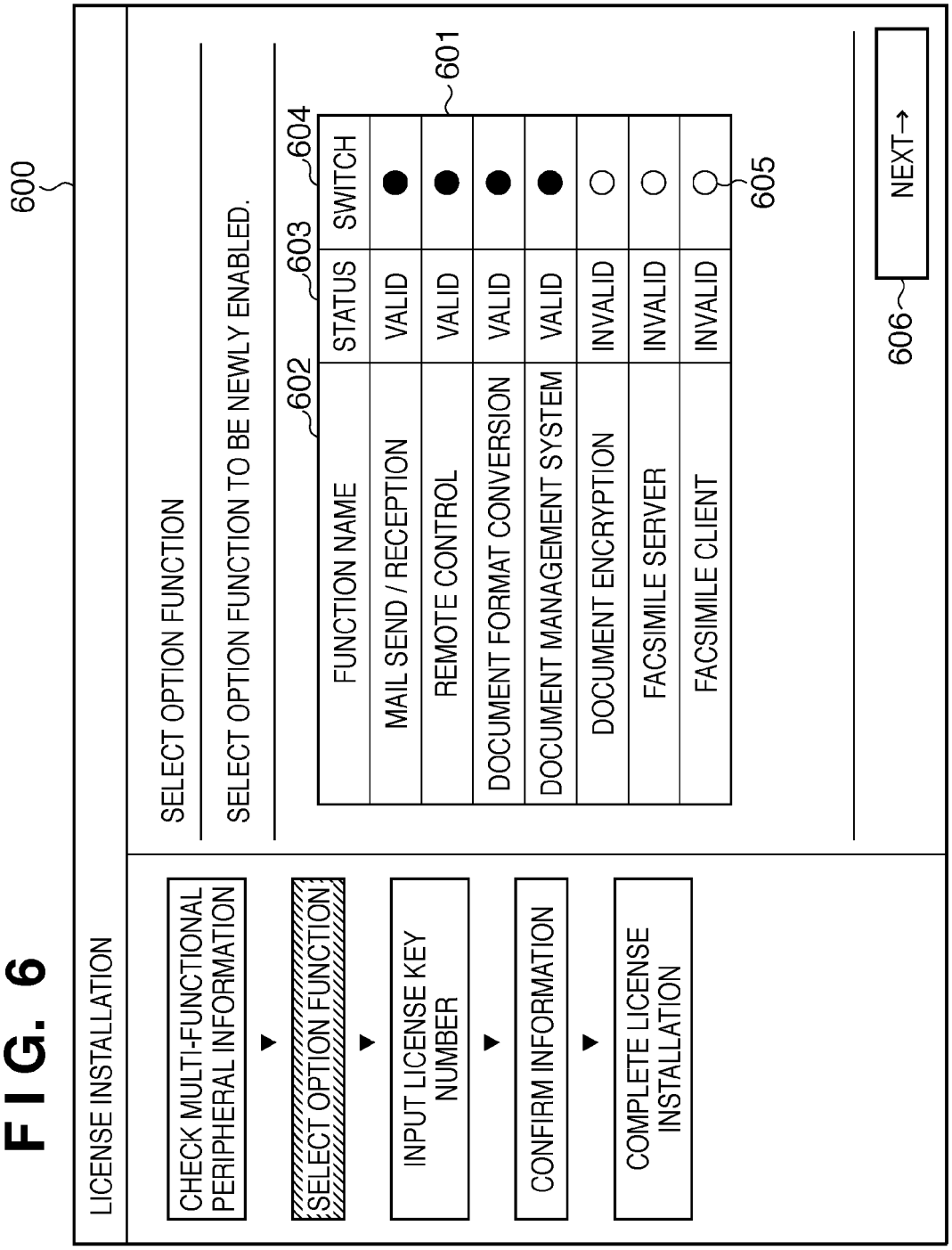
FIG. 6 is a view showing an example of an operation window which is displayed on (the operation panel of) the operation unit of the image forming apparatus shown in FIG. 1, and includes an option function selection list.

FIG. 6 shows an operation window 600 displayed on (the operation panel of) the operation unit 40 when the user selects the Next button 504 of the operation window 500 shown in FIG. 5. The operation window 600 includes an option function selection list 601 in which a function name 602 of each option function, a status 603 of the option function, and a switch 604 for enabling or disabling the option function are displayed on one line. When enabling an option function, the user selects a switch represented by a radio button on the same line as that of the function name of the currently invalid option function. For example, when enabling an option function "facsimile client" in the option function selection list 601, the user selects a switch 605 represented by a radio button on the line describing "facsimile client", and then selects a Next button 606. When disabling an option function, the user selects a switch represented by a radio button on the same line as that of the function name of the currently valid option function.

Figure 7:
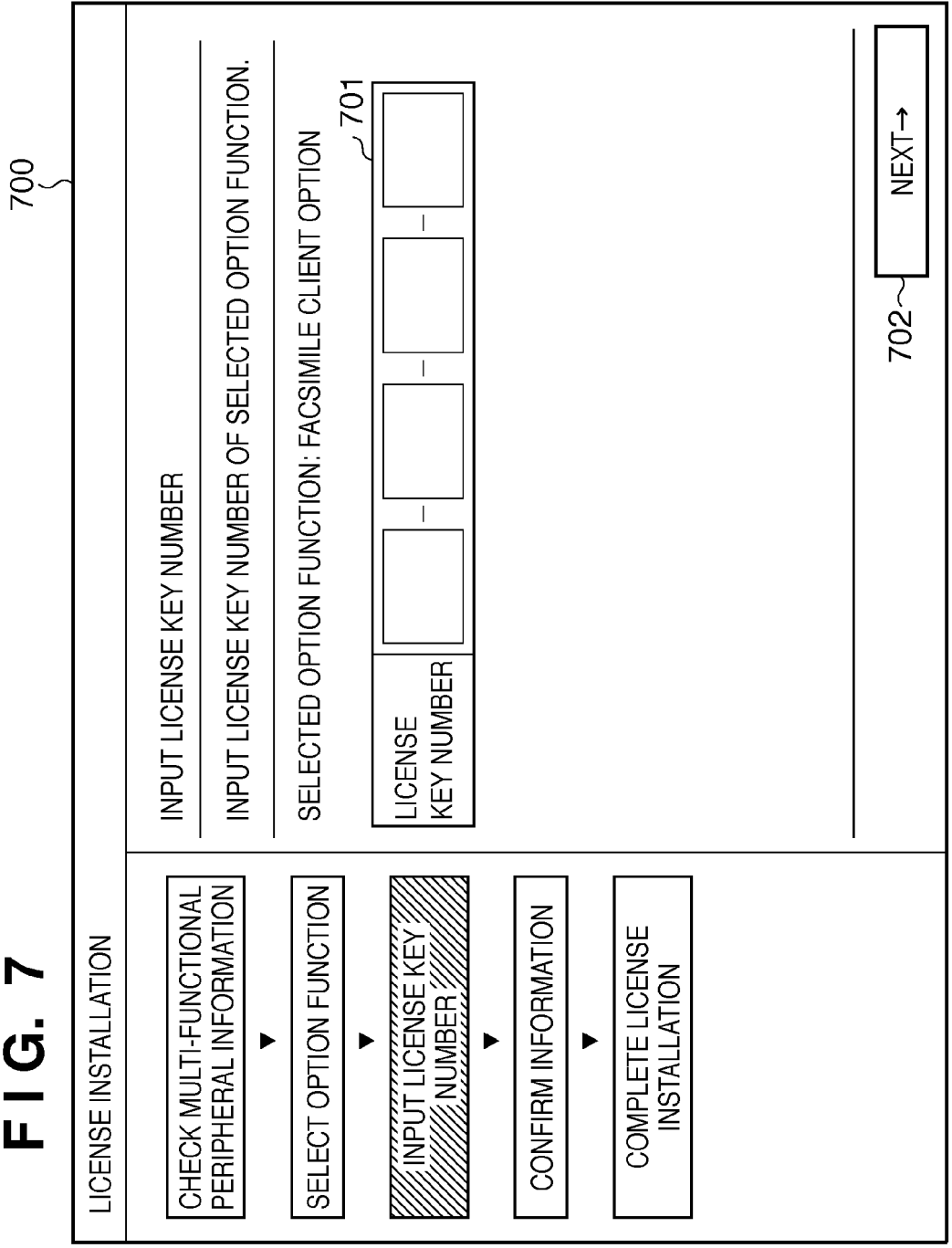
FIG. 7 is a view showing an example of an operation window which is displayed on (the operation panel of) the operation unit of the image forming apparatus shown in FIG. 1, and includes a license key number input field for inputting the license key number of an option function.

FIG. 7 shows an operation window 700 displayed on (the operation panel of) the operation unit 40 when the user selects the Next button 606 of the operation window 600 shown in FIG. 6. The operation window 700 includes a license key number input field 701 for inputting the license key number of an option function selected in the operation window 600 shown in FIG. 6. The user inputs the license key number of an option function to be enabled in the license key number input field 701 of the operation window 700, and selects a Next button 702. Note that the user obtains in advance (the number of) the license key of an option function.

Figure 8:
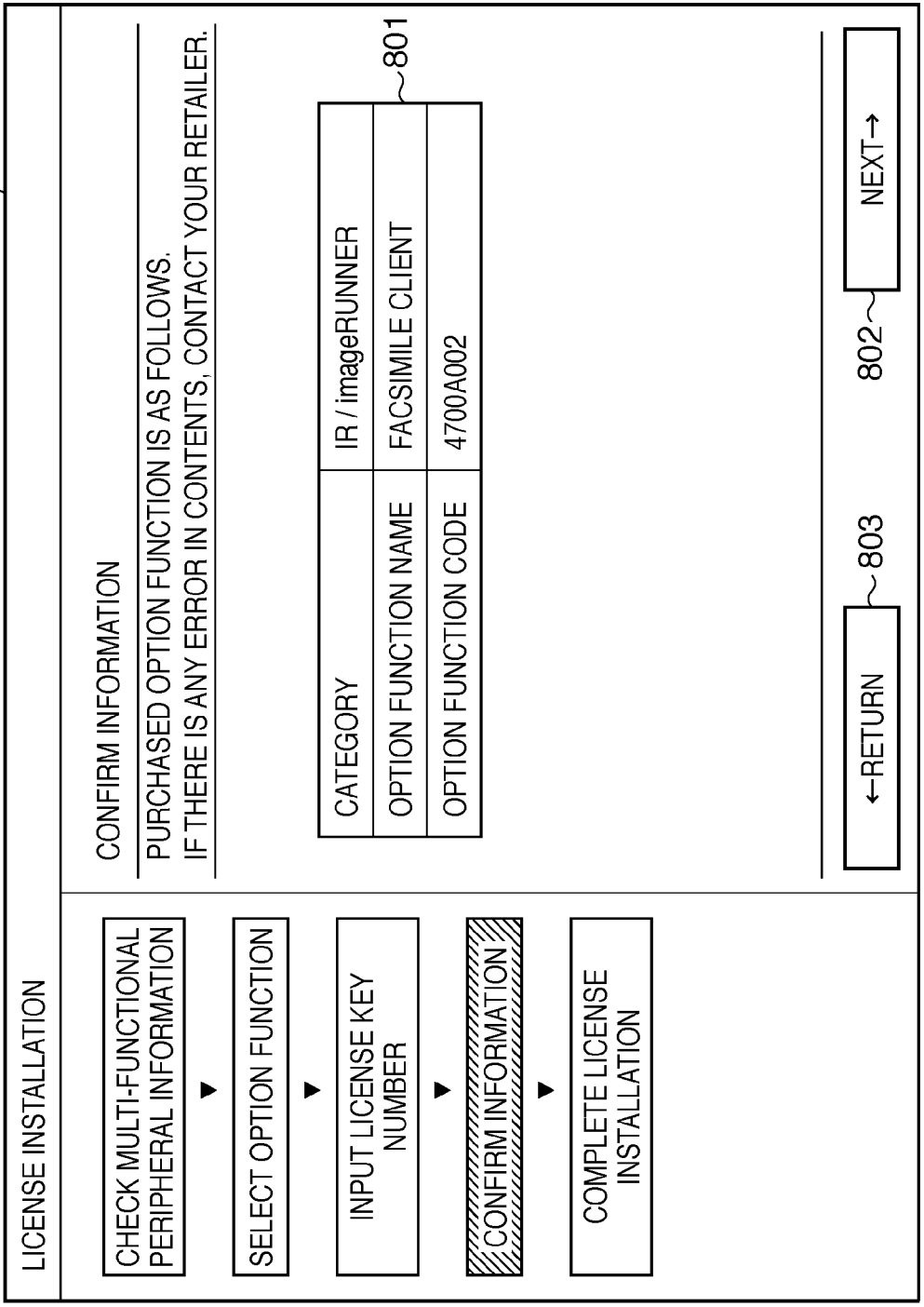
FIG. 8 is a view showing an example of an operation window which is displayed on (the operation panel of) the operation unit of the image forming apparatus shown in FIG. 1, and includes an enabling information checklist of an option function whose license key number has been input.

FIG. 8 shows an operation window 800 displayed on (the operation panel of) the operation unit 40 when the user selects the Next button 702 of the operation window 700 shown in FIG. 7. The operation window 800 includes an enabling information checklist 801 of an option function whose license key number has been input to the license key number input fields 701 of the operation window 700 shown in FIG. 7. The enabling information checklist 801 displays detailed information of an option function to be enabled. If the contents of the enabling information checklist 801 have no errors, the user selects a Next button 802. If the contents of the enabling information checklist 801 have an error, the user selects a Return button 803.

Figure 9:
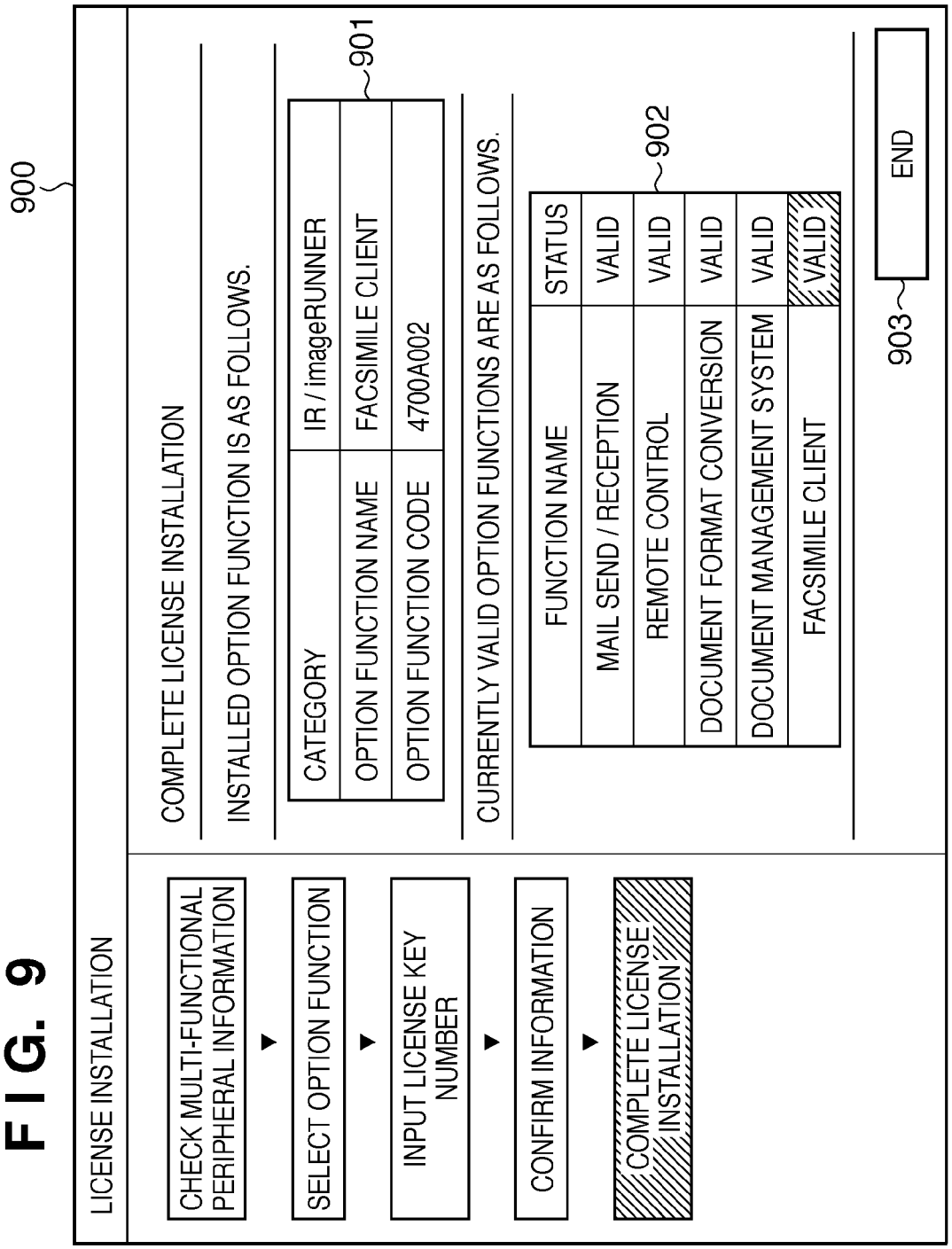
FIG. 9 is a view showing an example of an operation window which is displayed on (the operation panel of) the operation unit of the image forming apparatus shown in FIG. 1, and includes function information of installed option functions and an option function list of currently valid option functions.

FIG. 9 shows an operation window 900 displayed on (the operation panel of) the operation unit 40 when the user selects the Next button 802 of the operation window 800 shown in FIG. 8. The operation window 900 appears upon completion of license installation. The operation window 900 includes function information 901 of installed option functions, and an option function list 902 of currently valid option functions. The user checks the function information 901 and option function list 902, and selects an End button 903. As a result, option function enabling processing in the image forming apparatuses 1 to 3 is complete.

A facsimile function implemented by the image forming apparatuses 1 to 3 in cooperation with each other will be explained.

Figure 10:
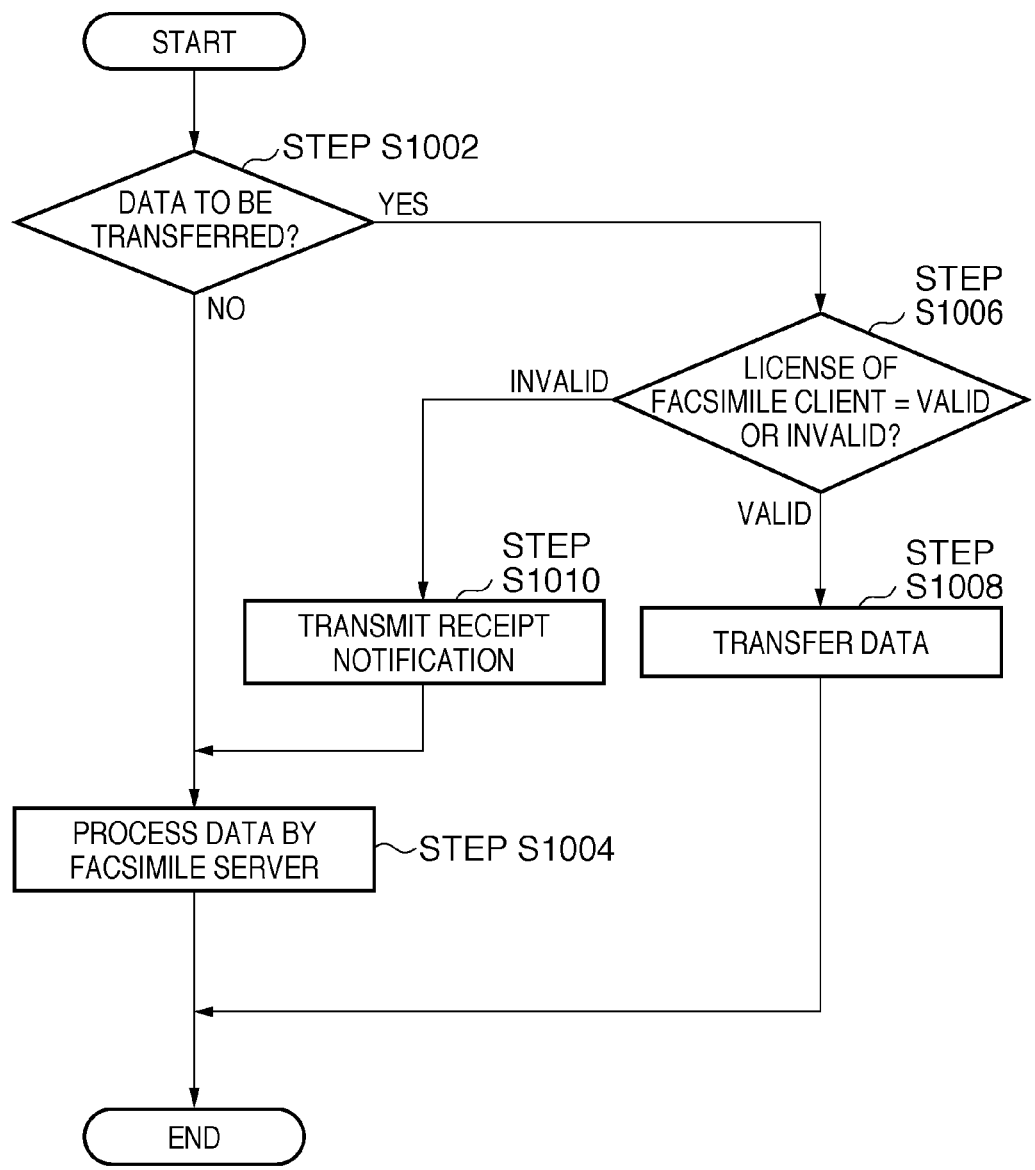
FIG. 10 is a flowchart for explaining facsimile reception processing in an image forming apparatus serving as a facsimile server.

FIG. 10 is a flowchart for explaining facsimile reception processing in the image forming apparatus 1 serving as a facsimile server. The facsimile reception processing starts when the facsimile functional unit 304 receives facsimile data (image data) via the public line 5, and the job control functional unit 305 invokes the facsimile server application 315. In step S1002, the image forming apparatus 1 determines whether the received image data is data to be transferred to the image forming apparatus 2 or 3 serving as a facsimile client. More specifically, whether the received image data is data to be transferred to the image forming apparatus 2 or 3 serving as a facsimile client is determined in accordance with a transfer setting table shown in FIG. 11 based on the originating number and terminating telephone number upon receiving the image data. FIG. 11 is a table showing an example of the transfer setting table held in the image forming apparatus 1 serving as a facsimile server.

The transfer setting table shown in FIG. 11 is set in the image forming apparatus 1 when client settings are made in the image forming apparatus 2 or 3 serving as a facsimile client. The transfer setting table is not automatically deleted because it provides a function of sending a receipt notification representing reception of image data even when the option function of a facsimile client becomes invalid. The transfer setting table includes an originating number field 1101 which records facsimile originating number information upon receiving image data by the modem 107, and a terminating telephone number field 1102 which records a terminating telephone number (telephone number of the facsimile server) upon receiving image data by the modem 107. The transfer setting table also includes a facsimile server processing-transfer field 1103 which records, in accordance with the originating number and terminating telephone number, whether to transfer (or perform transfer processing) received image data to a facsimile client or process it by the facsimile server. The transfer setting table further includes a client information field 1104 which records facsimile client information when performing transfer processing for received image data. The client information field 1104 records the IP address of a facsimile client in the embodiment, but may also record the telephone number of a facsimile client.

Referring back to FIG. 10, if the image forming apparatus 1 determines in step S1002 that the received image data is not data to be transferred (i.e., the data is to be processed by the image forming apparatus 1), it processes the received data in step S1004. For example, the image forming apparatus 1 prints (outputs) the received data, or stores it in a nonvolatile storage area such as the HDD 104. After the image forming apparatus 1 processes the received data, the facsimile reception processing ends.

If the image forming apparatus 1 determines in step S1002 that the received image data is data to be transferred, it determines in step S1006 whether the license of the destination image forming apparatus serving as a facsimile client is valid or invalid. More specifically, the image forming apparatus 1 sends an inquiry to the destination image forming apparatus via the network 4, and receives a reply to the inquiry. If the license of the destination image forming apparatus serving as a facsimile client is valid (i.e., the facsimile client is the image forming apparatus 3), the process advances to step S1008. If the license of the destination image forming apparatus serving as a facsimile client is invalid (i.e., the facsimile client is the image forming apparatus 2), the process advances to step S1010.

In step S1008, the image forming apparatus 1 transfers the received data to the image forming apparatus serving as a facsimile client. Then, the facsimile reception processing ends.

In step S1010, the image forming apparatus 1 transmits a receipt notification (FAX receipt notification report) representing that the image forming apparatus 1 has received the data, without transferring the received data to the facsimile client.

FIG. 12 is a view showing an example of a receipt notification transmitted from the image forming apparatus 1 serving as a facsimile server to the image forming apparatus serving as a facsimile client whose license is invalid. The image forming apparatus 1 serving as a facsimile server generates this receipt notification when the license of the facsimile client application 316 (option function) of the image forming apparatus 2 serving as a facsimile client is invalid. However, it is also possible to transmit, from the image forming apparatus 1 serving as a facsimile server to the image forming apparatus 2 serving as a facsimile client, information necessary to generate a receipt notification as shown in FIG. 12, and generate the receipt notification by the image forming apparatus 2. The receipt notification shown in FIG. 12 includes a receipt report 1201 describing the contents of received data, and a report 1202 describing that the license of the facsimile client application 316 is invalid. As shown in FIG. 13, the receipt notification may also include partial data 1302 of received data, in addition to a receipt report 1301 describing the contents of the received data and also describing that the license is invalid. The partial data 1302 of received data may also be, for example, the reduced image of the image of the received data. Further, as shown in FIG. 14, the receipt notification may also include information 1402 for enabling the facsimile client application 316, in addition to a receipt report 1401 describing the contents of received data and also describing that the license is invalid. FIGS. 13 and 14 are views showing examples of a receipt notification transmitted from the image forming apparatus 1 serving as a facsimile server to an image forming apparatus serving as a facsimile client whose license is invalid.

In step S1010, after transmitting the receipt notification to the facsimile client, the image forming apparatus 1 processes the received data in step S1004. Then, the facsimile reception processing ends.

In the embodiment, it is determined in step S1006 whether the license of a destination image forming apparatus serving as a facsimile client is valid, and then transfer processing is executed. However, it is also possible to transfer received data to a destination image forming apparatus, receive a reply (i.e., a reply representing that the license of a facsimile client is invalid) from the destination image forming apparatus, and then transmit a receipt notification.

Figure 15:
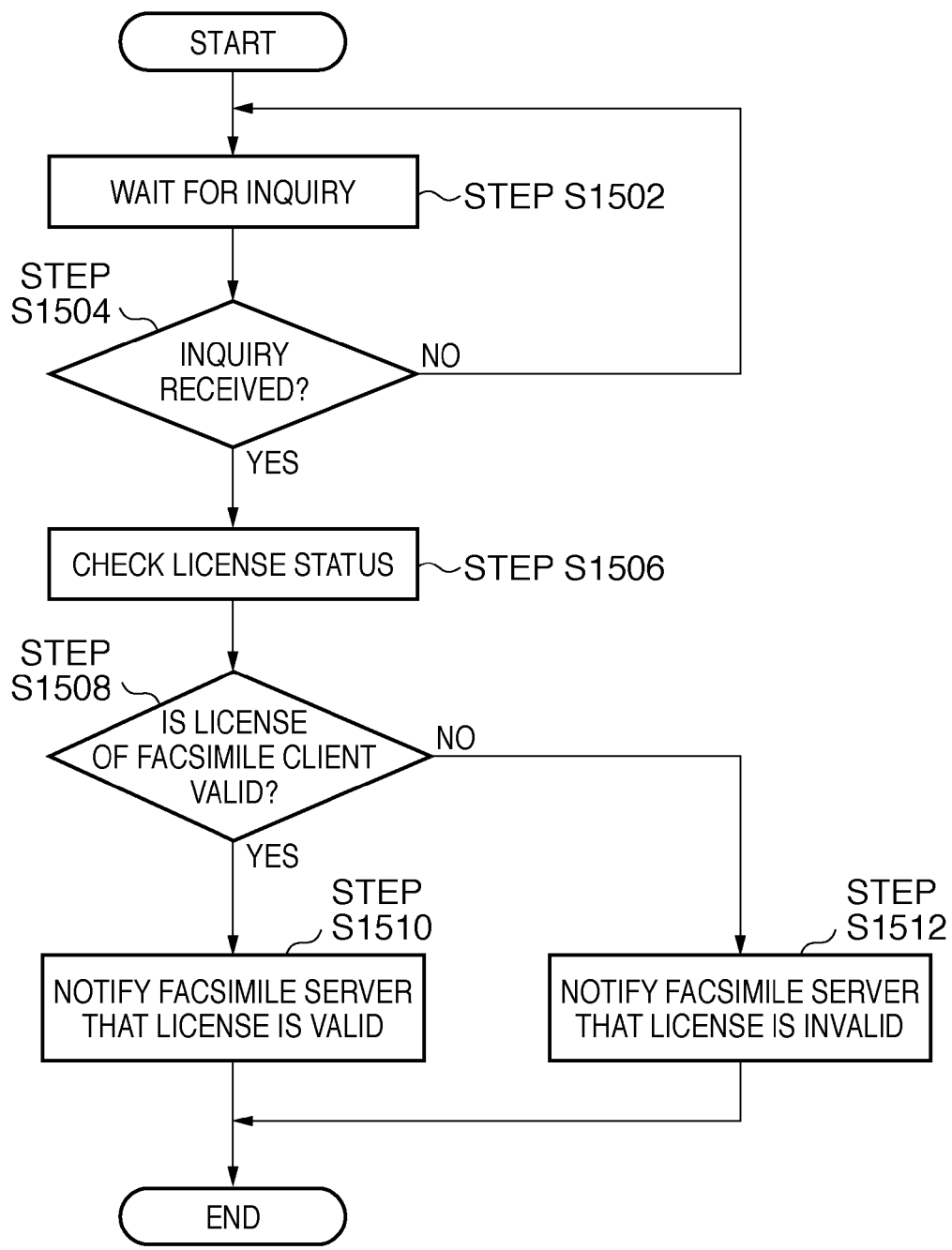
FIG. 15 is a flowchart for explaining partial processing (processing to check whether the license of facsimile client is valid or invalid) in facsimile reception processing in an image forming apparatus serving as a facsimile client.

FIG. 15 is a flowchart for explaining partial processing (processing to check whether the license of facsimile client is valid or invalid) in facsimile reception processing in the image forming apparatuses 2 and 3 serving as facsimile clients.

In step S1502, the image forming apparatus 2 or 3 serving as a facsimile client waits for an inquiry from the image forming apparatus 1 serving as a facsimile server about whether the license of the facsimile client is valid or invalid. In step S1504, the image forming apparatus 2 or 3 serving as a facsimile client checks an inquiry from the image forming apparatus 1 serving as a facsimile server about whether the license of the facsimile client is valid or invalid. If the image forming apparatus 2 or 3 serving as a facsimile client has received the inquiry, the process advances to step S1506; if it has not received the inquiry, returns to step S1502.

In step S1506, the image forming apparatus 2 or 3 serving as a facsimile client confirms the license status of the facsimile client (facsimile client application 316) from the license management functional unit 309.

In step S1508, the image forming apparatus 2 or 3 serving as a facsimile client determines, based on the confirmation result in step S1506, whether the license of the facsimile client is valid. If the license is valid, the process advances to step S1510; if it is invalid, to step S1512.

In step S1510, the image forming apparatus 2 or 3 serving as a facsimile client notifies the inquiring image forming apparatus 1 serving as a facsimile server that the license of the facsimile client is valid. Then, the processing to check whether the facsimile client is valid or invalid ends.

In step S1512, the image forming apparatus 2 or 3 serving as a facsimile client notifies the inquiring image forming apparatus 1 serving as a facsimile server that the license of the facsimile client is invalid. Then, the processing to check whether the facsimile client is valid or invalid ends.

Figure 16:
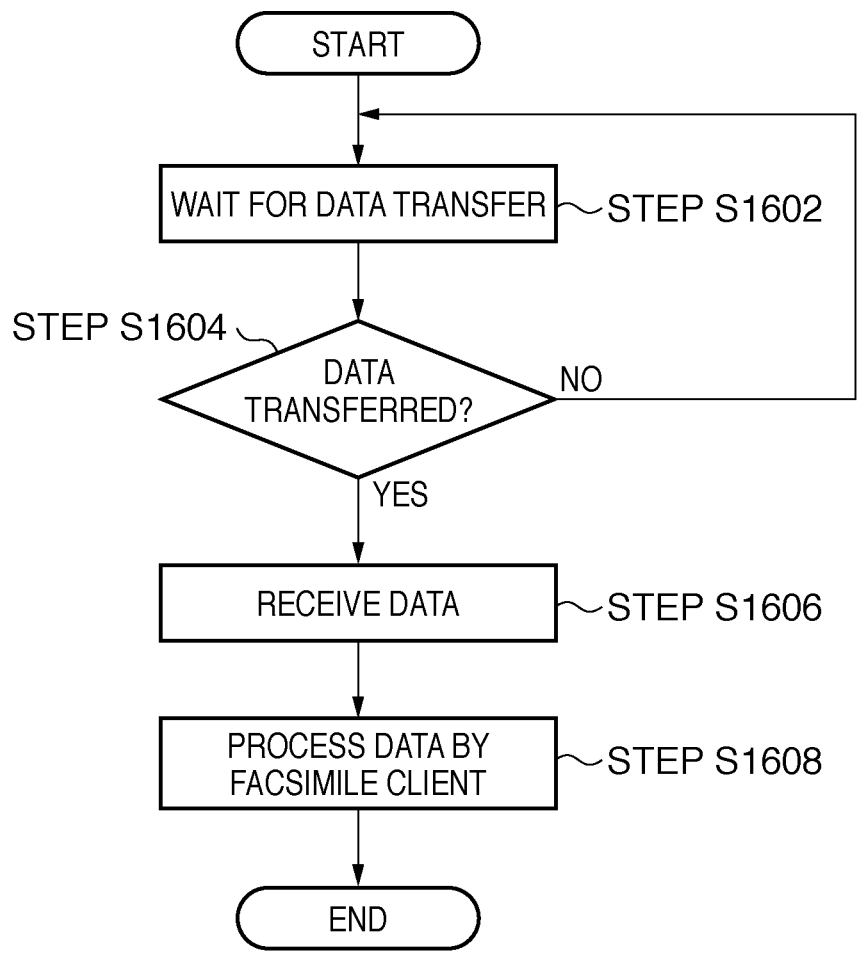
FIG. 16 is a flowchart for explaining facsimile reception processing in an image forming apparatus serving as a facsimile client.

FIG. 16 is a flowchart for explaining facsimile reception processing in the image forming apparatuses 2 and 3 serving as facsimile clients.

In step S1602, the image forming apparatus 2 or 3 serving as a facsimile client waits for transfer of facsimile data (image data) from the image forming apparatus 1 serving as a facsimile server. In step S1604, the image forming apparatus 2 or 3 serving as a facsimile client determines whether the image forming apparatus 1 serving as a facsimile server has transferred image data (i.e., the image forming apparatus 2 or 3 has received image data). If the image forming apparatus 1 has transferred image data, the process advances to step S1606; if it has not transferred image data, returns to step S1602.

In step S1606, the image forming apparatus 2 or 3 serving as a facsimile client receives image data transferred from the image forming apparatus 1 serving as a facsimile server.

In step S1608, the image forming apparatus 2 or 3 serving as a facsimile client processes the image data received in step S1606. For example, the image forming apparatus 2 or 3 serving as a facsimile client prints (outputs) the received data, or stores it in a nonvolatile storage area such as the HDD. After the image forming apparatus 2 or 3 serving as a facsimile client processes the received data, the facsimile reception processing ends.

In this manner, in the image forming apparatuses 1 to 3, when the license of a facsimile client becomes invalid, the facsimile server transmits a receipt notification to the facsimile client, and processes received data. Thus, even if the validity period of the facsimile client (option function) has expired, the user can easily recognize the reception of data without losing the received data in the facsimile server.

According to the embodiment, for example, the facsimile function of a remote image forming apparatus can be used during the validity period of the trial license of the facsimile function. When the validity period of the trial license of the facsimile function of an apparatus to which received data is to be transferred has expired, the transfer of facsimile-received data to the apparatus can be restricted to transmit a receipt notification representing that the facsimile data has been received. At this time, information of part of the facsimile data, and information for enabling the license of the facsimile function can also be notified. Hence, even if the license of the facsimile function becomes invalid, the user can recognize that a remote image forming apparatus has received facsimile data, and determine whether to acquire the data.

The embodiment can also be achieved by executing the following processing. That is, a storage medium which stores software program codes for implementing the functions of the above-described embodiment is supplied to a system or apparatus, and the computer (or the CPU or MPU) of the system or apparatus reads out the program codes stored in the storage medium.

In this case, the program codes read out from the storage medium implement the functions of the above-described embodiment, and the program codes and the storage medium which stores the program codes constitute the present invention.

The storage medium for supplying the program codes includes a Floppy® disk, hard disk, magnetooptical disk, CD-ROM, CD-R, CD-RW, DVD-ROM, DVD-RAM, DVD-RW, DVD+RW, magnetic tape, nonvolatile memory card, and ROM. The program codes may also be downloaded via a network.

The present invention also includes a case where the computer executes the readout program codes and thereby implements the functions of the above-described embodiment. Also, the present invention includes a case where an OS (Operating System) or the like running on the computer performs part or all of actual processing on the basis of the instructions of the program codes and thereby implements the functions of the above-described embodiment.

Furthermore, the present invention includes a case where the functions of the above-described embodiment are implemented by the following processing. That is, the program codes read out from the storage medium are written in the memory of a function expansion board inserted into the computer or the memory of a function expansion unit connected to the computer. Then, the CPU of the function expansion board or function expansion unit performs part or all of actual processing on the basis of the instructions of the program codes.

A preferred embodiment of the present invention has been described. However, the present invention is not limited to the embodiment, and can be variously changed and modified without departing from the spirit and scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-294878 filed on Nov. 13, 2007, which is hereby incorporated by reference herein in its entirety.

What is claimed is:

1. A facsimile apparatus comprising:
a first receiving unit configured to perform facsimile reception;
a transfer unit configured to transfer facsimile data received by the facsimile reception to a destination apparatus;
an inquiring unit configured to inquire of the destination apparatus whether a license concerning the facsimile reception is valid or invalid in the destination apparatus;
a second receiving unit configured to receive a reply to the inquiry performed by said inquiring unit from the destination apparatus; and
a control unit configured to control said transfer unit so that the facsimile data is transferred to the destination apparatus on condition of that the replay received by said second receiving unit represents that the license is valid in the destination apparatus,
wherein said transfer unit does not transfer the facsimile data to the destination apparatus when the reply received by said second receiving unit represents that the license is invalid in the destination apparatus.

2. The apparatus according to claim 1, further comprising:
a transmitting unit configured to transmit a receipt notification representing that the facsimile data has been received to the destination apparatus on condition of that the replay received by said second receiving unit represents that the license is invalid in the destination apparatus.

3. The apparatus according to claim 1, further comprising:
a printing unit configured to print the facsimile data on condition of that the replay received by said second receiving unit represents that the license is invalid in the destination apparatus.

4. A method of controlling a facsimile apparatus, the method comprising:
a first receiving step of performing facsimile reception;
a transferring step of transferring facsimile data received by the facsimile reception to a destination apparatus;
an inquiring step of inquiring of the destination apparatus whether a license concerning the facsimile reception is valid or invalid in the destination apparatus
a second receiving step of receiving a reply to the inquiry performed in the inquiring step from the destination apparatus; and
a control step of controlling the transferring step so that the facsimile data is transferred to the destination apparatus on condition of that the replay received in the second receiving step represents that the license is valid in the destination apparatus,
wherein the transferring step does not transfer the facsimile data to the destination apparatus when the reply received in the second receiving step represents that the license is invalid in the destination apparatus.

5. A non-transitory computer-readable storage medium storing a program that, when executed by a computer, causes the computer to execute a method of controlling a facsimile apparatus, the method comprising:
a first receiving step of performing facsimile reception;
a transferring step of transferring facsimile data received by the facsimile reception to a destination apparatus;
an inquiring step of inquiring of the destination apparatus whether a license concerning the facsimile reception is valid or invalid in the destination apparatus;
a second receiving step of receiving a reply to the inquiry performed in the inquiring step from the destination apparatus; and
a control step of controlling the transferring step so that the facsimile data is transferred to the destination apparatus on condition of that the replay received in the second receiving step represents that the license is valid in the destination apparatus,
wherein the transferring step does not transfer the facsimile data to the destination apparatus when the reply received in the second receiving step represents that the license is invalid in the destination apparatus.

6. The apparatus according to claim 1, wherein said inquiring unit inquires of the destination apparatus whether the license is valid or invalid in the destination apparatus when the first receiving unit receives the facsimile data.

* * * * *